Oct. 7, 1969        J. L. GROSH        3,470,917
COMPOSITE REINFORCED PLASTIC PIPE
Filed May 29, 1967
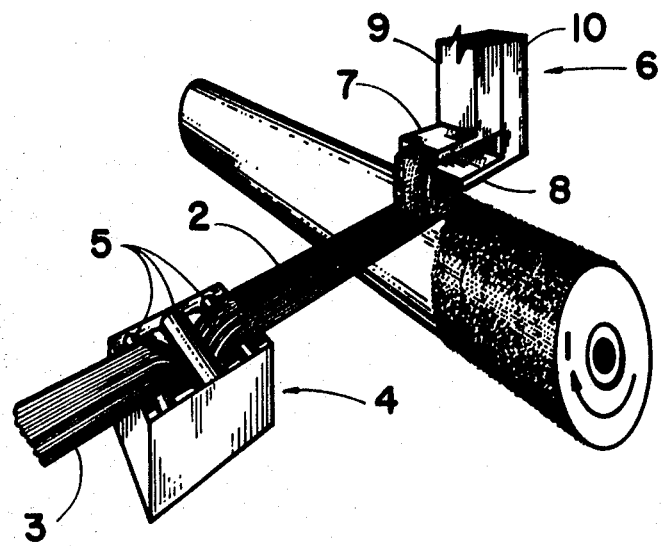
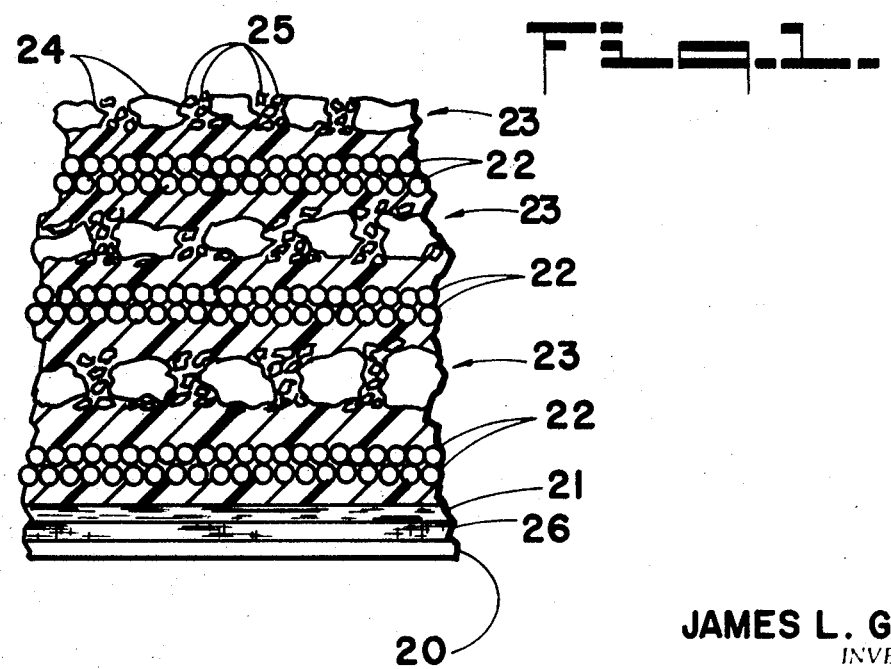
JAMES L. GROSH
INVENTOR.
BY
ATTORNEY United States Patent Office 3,470,917
Patented Oct. 7, 1969

3,470,917
COMPOSITE REINFORCED PLASTIC PIPE
James L. Grosh, Los Altos, Calif., assignor to United
Aircraft Corporation, East Hartford, Conn., a corporation of Delaware
Continuation-in-part of application Ser. No. 546,676,
May 2, 1966. This application May 29, 1967, Ser.
No. 641,962
Int. Cl. F16l 9/14, 9/12
U.S. Cl. 138—145                    3 Claims

ABSTRACT OF THE DISCLOSURE

A process for providing reinforced plastic pipe wherein particulate material is incorporated in the resin matrix between the layers of continuous filaments. The particulate material is applied in a bimodal manner with coarse particles being applied first and fine particles applied over the coarse particles to fill the spaces therebetween.

BACKGROUND OF THE INVENTION

This application is a continuation in part of my copending coassigned patent application Ser. No. 546,676 filed May 2, 1966 for Composite Reinforced Plastic Pipe.

This invention relates to composite reinforced plastic pipes and more particularly to a composite reinforced plastic pipe capable of withstanding both internal and external pressure loads and methods for the fabrication of such pipe.

Reinforced plastic pipes are commonly formed by generating a cylinder from suitable filamentary material by continuously winding the filaments on a removable mandrel, the filaments being impregnated with a curable resinous material either before application to the mandrel or upon application to the mandrel, followed by curing of the structure and removal of the mandrel. By appropriate selection of the filamentary material and the binder typically glass filaments and an epoxy or polyester resin, strong, corrosion resistant structures can be fabricated.

Due to the high strength of the fiberglass filaments, such a structure is capable of withstanding substantial internal pressure loads. In most applications for large diameter pipes, such as in underground lines, however, the wall thickness is dictated by the external pressure and the nonuniform D loads (see ASTM C–76–63 T) produced by the ground loading rather than the internal pressure thus requiring structures having walls substantially thicker than would be necessary to withstand internal pressures normally encountered. Since the cost of the raw materials needed for a reinforced plastic pipe capable of withstanding a given external pressure load is substantially greater than the cost of competing materials such as reinforced concrete or steel, the latter materials are generally used in large diameter pipe applications even though the reinforced plastic pipe has generally superior physical and chemical properties.

In order to overcome this difficulty, it has been proposed to form large diameter reinforced plastic pipe in the form of sandwich structures. Such a structure consists of a thin layer of fiberglass reinforced plastic capable of withstanding the internal pressure loading surrounded by a thick mass of a core material capable of withstanding the compressive load and D loads such as concrete, for example, over which is wrapped a thin layer of reinforced plastic. When such cylindrical structures are subject to external loads, however, the deformation of the circular cross section is resisted by shear loads at the interfaces between the core material and reinforced plastic and failure of the structure occurs at the bond between these materials.

According to this invention, however, an inexpensive composite reinforced plastic pipe is provided that is capable of withstanding substantial external pressure loads and D loads without failure.

SUMMARY OF THE INVENTION

Broadly, this invention contemplates a composite reinforced plastic pipe comprised of a plurality of layers of high strength filamentary material, successive layers each being separated by a layer of a particulate material, the entire structure being bonded together by a cured resinous binder. The relative thickness of the filamentary layer and the particulate layer should be carefully adjusted since too thin a particulate layer will require excessive amounts of fiberglass in the finished pipe and too thick a layer will create internal shear stresses which will cause cracks at the interfaces between the filaments and the particles upon deformation of the pipe. It has been found that the ratio of thickness of the particulate layer to the filamentary layer, $T_p/T_f$ should be within the range of from 2–50 and preferably at about 6.

It should be noted that the ratio of the $T_p/T_f$ need not be constant across the wall of the pipe. Since the shear stresses are not uniformly distributed across the wall, it is possible to maximize the properties of the pipe by employing low $T_p/T_f$ values in the regions of stress concentration and higher values of $T_p/T_f$ in low stress areas.

For example, the shear stresses produced by the D loads concentrate within the wall adjacent to the internal and external surfaces thereof. The $T_p/T_f$ value in these regions can be selected in the lower portion of the range whereas in the central portion of the wall where there is little shear stress, the $T_p/T_f$ value can be selected in the upper portion of the range.

It is desirable to have a high solids loading in the particulate layers to increase the resistance to D loads and also to have accurate control of the particle layer thickness. According to this invention, the particulate material is applied in a bimodal manner, with large particles being applied first to establish the layer thickness and small particles applied over and between the large particles to increase the solids loading.

Preferably the pipe would be designed such that the structure, after curing of the resinous binder, contains sufficient filamentary material to withstand the internal pressure loads and sufficient particulate material between the filamentary layers to withstand the compressive and D loads. However, due to the above limitations on the relative thicknesses of the respective layers, in some applications when extremely high external loading pressures are encountered, it may be necessary to incorporate amounts of filamentary material in excess of that required to withstand the internal pressures.

Due to its high strength, chemical and physical properties and commercial availability, fiberglass is the preferred filamentary material. However, other high strength filaments such as metallic wires or filaments and other materials such as filamentary silica could be employed. The filaments may be in the form of continuous filaments or a continuous fabric such as woven fiberglass cloth or as a fiber formed of braided filaments.

The preferred particulate material is sand. However, many other materials may be used such as particulate silica, small hollow spheres of various materials and carbon and graphite. If, for example, a light weight conduit is desired, vermiculite or small hollow spheres of various materials such as glass or phenolic resin would be preferred materials.

Any of the binder systems used in the preparation of reinforced plastic structures may be used in this invention, epoxy and polyester systems being particularly desirable.

It is an object of this invention to provide a composite reinforced plastic pipe capable of withstanding internal and external pressure loads.

It is another object of this invention to provide a method for fabricating composite reinforced plastic pipe.

It is another object of this invention to provide a method for incorporating high solids loading of particulate material in a reinforced plastic pipe with control of the particulate layer thickness.

These and other objects of this invention will be readily apparent from the following description with reference to the accompany drawings wherein:

FIGURE 1 is a schematic representation of the fabrication of pipe according to this invention and FIGURE 2 is an enlarged sectional view through the wall of a pipe according to this invention.

DESCRIPTION OF THE INVENTION

Referring now to FIGURE 1, a schematic representation of a system for fabricating pipe according to this invention is shown. Since the apparatus forms no part of this invention, only the elements necessary for an understanding of this invention are shown, a complete description of a suitable machine appearing in U.S. Patent No. 3,228,616.

A mandrel adapted for rotation as shown by the arrow has a band 2 of filaments 3 wet with resin by passage through resin pot 4 and across wiping rollers 5 continuously applied thereto. The filaments are continuously wrapped around the mandrel along the length thereof by causing relative reciprocal longitudinal motion between the mandrel and the band while the mandrel is rotating. The pitch or winding angle can be controlled, as is known in the art, by appropriate selection of the speed of rotation of the mandrel and the speed of longitudinal motion. The filament band 2 is preferably applied at a very high winding angle so that the continuous annularly disposed flaments are essentially hoop windings.

A hopper assembly 6 is provided which is maintained over mandrel 1 at the location where band 2 contacts mandrel 1. Hopper assembly 6 comprises two separate discharge portions 7 and 8 each of which have a separate feed portion 9 and 10. Discharge portion 7 is located in front of discharge portion 8 such that particles fed from discharge 7 will be applied to the band 2 first and as the mandrel rotates particles from discharge 8 will be applied over the particles from discharge 7. Sufficient resin is contained on band 2 to cause the particles applied to adhere thereto. Particles in supply portion 9 are of larger size than in supply portion 10 so that larger sized particles are applied first with the smaller sized particles being applied over the larger particles and in the spaces therebetween.

This process is continued for a number of passes sufficient to build up the desired wall thickness after which the resin is cured and the mandrel removed. By this technique greater uniformity in the thickness of the sand layers and a higher solid loadings are obtained than where particles of random size or of just one size are employed. When random size particles are employed the thickness of the sand layer is irregular. When single sized particles are employed the thickness can be controlled but the solids loading is relatively low. By the instant technique the larger particles are applied to the band first, establishing a uniform layer thickness, and the smaller particles then are applied and sift beween the larger particles to increase the solids loading without increasing the thickness of the particle layers.

The particle sizes can be selected within fairly wide limits with the following sizes being representative rather than limiting. A large particle in the range of from 8 to 64 mesh and small particles size in the range of 100 mesh to 5 micron have been found to produce pipe having the desired characteristics.

Referring now to FIGURE 2 a cross section, highly enlarged and exaggerated for clarity, through the wall of a pipe manufactured according to this invention is shown. The inner layer 20 is a gel coat containing veil cloth 26 which was initially applied around the resin coated mandrel. To provide longitudinal reinforcement a layer of longitudinally extending filaments 21 have been applied over the veil cloth as is described in my copending, coassigned patent application for Transverse Filament Reinforcing Tape and Method and Apparatus for the Production Thereof of like date herewith. Layers of annularly disposed filaments 22 are separated by particle layers 23 each composed of large particles 24 and smaller particles 25 with the thickness of the particle layers being determined substantially by the larger particles 24. The entire structure is held together by the cured resinous matrix.

Example I

A 24" I.D. and 24¾" O.D. pipe was manufactured according to this invention employing fiberglass filaments and sand having 16 mesh 200 mesh average size. The fiberglass layers were about .005" thick and the particle layers were about .05" thick. The finished pipe consisted of about 35% resin, 15% glass and 50% sand with about 10% by weight of sand being in the form of fine particles.

While this invention has been described with respect to specific examples thereof it should not be construed as limited thereto. Various modifications and substitutions will be obvious to workers in the art and can be made without departing from the scope of this invention.

I claim:

1. In a composite reinforced plastic pipe comprising a cured polymeric matrix containing a plurality of layers of continuous annularly disposed high tensile strength filaments said layers being separated from each other by a layer of particulate material, the improvement wherein said particulate material comprises first particles and second particles, the average size of said first particles being larger than the average size of said second particles, said first and second sized particles being oriented in said particulate material layer such that the width of separation of the both immediately adjacent filament layers is established substantially by said first sized particles and said second sized particles are located between said first sized particles whereby the uniformity of thickness an the solids loading of said particulate material is improved.

2. The pipe of claim 1 wherein said first particles have an average size of from 8 mesh to 64 mesh and said second particles have an average size of from 5 microns to 100 mesh.

3. The pipe of claim 2 wehrein said filaments are glass and said particles are sand.

References Cited

UNITED STATES PATENTS

| | | | |
|---|---|---|---|
| 1,998,892 | 4/1935 | Braden | 138—145 X |
| 2,360,109 | 10/1944 | Converse | 138—145 |
| 3,301,278 | 1/1967 | Lander et al. | 138—145 |
| 3,357,456 | 12/1967 | Grawey et al. | 138—127 |

LOUIS K. RIMRODT, Primary Examiner

U.S. Cl. X.R.

138—127; 156—173